(12) United States Patent
Chen

(10) Patent No.: US 6,678,438 B2
(45) Date of Patent: Jan. 13, 2004

(54) APPARATUS AND METHOD FOR SWITCHING AN OPTICAL PATH

(75) Inventor: Chen-Su Chen, Tainan (TW)

(73) Assignee: Chynoptics Technologies, Inc., Hsinchu (TW)

( * ) Notice: Subject to any disclaimer, the term of this patent is extended or adjusted under 35 U.S.C. 154(b) by 0 days.

(21) Appl. No.: 09/955,929

(22) Filed: Sep. 20, 2001

(65) Prior Publication Data

US 2003/0053745 A1 Mar. 20, 2003

(51) Int. Cl.[7] ................................. G02B 6/34
(52) U.S. Cl. .................... 385/20; 385/16; 385/21; 385/36
(58) Field of Search ................ 385/16, 17, 18, 385/19, 20, 21, 22, 23, 34, 36, 41, 42

(56) References Cited

U.S. PATENT DOCUMENTS

| | | | |
|---|---|---|---|
| 4,322,126 A | * | 3/1982 | Minowa et al. ............ 385/18 |
| 4,634,239 A | * | 1/1987 | Buhrer ...................... 385/18 |
| 4,790,621 A | * | 12/1988 | Calaby et al. ............. 385/21 |
| 5,838,847 A | | 11/1998 | Pan et al. |
| 6,044,186 A | | 3/2000 | Chang et al. |
| 6,088,166 A | | 7/2000 | Lee |
| 6,215,919 B1 | | 4/2001 | Li |
| 6,249,625 B1 | | 6/2001 | Pan |
| 6,477,289 B1 | * | 11/2002 | Li .............................. 385/16 |
| 2001/0031111 A1 | * | 10/2001 | Irwin ........................ 385/16 |
| 2002/0009254 A1 | * | 1/2002 | Sui ............................ 385/16 |

* cited by examiner

Primary Examiner—Robert H. Kim
Assistant Examiner—Michael H Caley
(74) Attorney, Agent, or Firm—Rabin & Berdo, P.C.

(57) ABSTRACT

An apparatus and method for switching one or more optical paths comprises one or more inputs and one or more outputs arranged with one or more free-space optical paths formed therebetween, and one or more prisms movable to the free-space optical paths being inserted into or removed from the free-space optical paths to control the propagation paths of one or more light beams between the inputs and outputs. When the prism is inserted into the free-space optical path, a switched optical path between the inputs and outputs is formed to direct the light beam with two refraction and one total reflection by the prism. When the prism is removed from the free-space optical path, the light beam propagates along the free-space optical path.

22 Claims, 9 Drawing Sheets

APPARATUS AND METHOD FOR SWITCHING AN OPTICAL PATH

FIELD OF THE INVENTION

The present invention relates generally to an apparatus and method for arrangement of light beams, and more particularly, to an apparatus and method for switching an optical path.

BACKGROUND OF THE INVENTION

Optical switches are basic and important elements in optical systems, especially in fiber optic communication systems. In a fiber optic communication system, an optical switch is employed to connect and disconnect the transmission path of an optical signal to route the light beam carrying information. In other optical systems optical switches are used to control the output of light sources. Due to the fast propagation of light, an optical switch should have a high switching rate for the operation of an optical system. Insertion loss is another main factor affecting the performance of an optical switch, and low insertion loss reduces the signal attenuation caused by the optical switch. An optical amplifier is added to increase the intensity of the optical signal when it is attenuated, and the insertion loss can be reduced by reducing the number of inserted optical elements and increasing the optical alignment accuracy. Optical misalignment might occur with an optical switch after it is repeatedly switched and thus significantly reduce the coupling rate of the optical signal switched by the optical switch. Therefore, stability is also very important for an optical switch.

A mechanic optical switch is a simple and cheap implementation theoretically; however, it suffers limitation. For instance, the optical switch and apparatus proposed by U.S. Pat. No. 6,044,186 issued to Chang et al. attaches the input optical fiber of an optical signal onto a switching member pivoting between two positions for the input optical fiber to be aligned with different output optical fibers in order to switch the optical signal. It is necessary for such approach to move the optical fiber, therefore, a very high accurate alignment is required and the reliability is low.

It is simpler and better to change an optical path by an optical element instead of by moving the optical fiber. Reflection type optical switches are proposed, such as by U.S. Pat. No. 5,838,847 issued to Pan et al., which place and remove a movable reflective device at the end of an optical fiber to change the optical path. However, the reflective device is too sensitive to angular variation to switch fast and accurately, and there are some optical switches that cannot be implemented with this technique.

In U.S. Pat. No. 6,088,166, Lee can parallel move a light beam from one optical fiber to another by a prism, with which the light beam is reflected twice by the prism. Although that is a simple and cheap implementation, the prism that serves as the optical switching element is too huge and heavy to reduce the size of the apparatus and as a result, it is disadvantageous to design the mechanism to operate the prism and to implement an apparatus with more inputs/outputs (I/O). In U.S. Pat. No. 6,215,919, Li et al. redirect a light beam by a wedge prism in combination with a suitably positioned gradient index lens in order to switch the light beam from one optical fiber to another. Although this approach can reduce the size and weight of the required prism, the control of the optical path becomes complicated and thus a highly precise prism and accurate optical alignment are necessary. In addition, it is difficult to achieve multiple I/O for an optical switch.

It is therefore desired to provide a simple, cheap, light and stable apparatus and method for switching an optical path.

SUMMARY OF THE INVENTION

One object of the present invention is an apparatus and method to change an optical path, by which different optical paths can be switched in order to control the propagation path of a light beam.

Another object of the present invention is an apparatus and method to change an optical path, by which the optical path is switched without moving the input or output of any optical fiber or signal.

Yet another object of the present invention is to disclose a small and light apparatus for switching an optical path.

Still another object of the present invention is to teach a simple and cheap apparatus and method for arrangement of an optical path.

According to the present invention, an apparatus and method for switching an optical path comprises one or more I/O of optical signals arranged to form a free-space optical path between the I/O, and a prism movable to the free-space optical path being inserted into or removed from the free-space optical path to control the propagation path of a light beam between the I/O.

When the prism is inserted into the free-space optical path, a switched optical path between the I/O is formed, the light beam from the input to the corresponding output is thus refracted twice and totally reflected once by the prism. When the prism is removed from the free-space optical path, the light beam propagates from the input to the output along the free-space optical path.

Preferably, the prism is a dove prism or an isosceles prism to reduce the size and weight of the optical switch apparatus.

The present invention can be applied to various types of optical switch apparatus, such as 1×2 optical switch, 2×1 optical switch, 2×2 optical switch, 2×2 blocking type optical switch, and on-off optical switch, even an optical switch with multiple I/O by stacked prisms, such as 1×4 optical switch and 2×4 optical switch.

BRIEF DESCRIPTION OF THE DRAWINGS

For a better understanding of the present invention, reference may be had to the following description of exemplary embodiments thereof, considered in conjunction with the accompanying drawings, in which.

DETAILED DESCRIPTION OF THE INVENTION

The present invention is characterized in that an optical path is changed based on a different principle from that in the prior art. In particular, the inventive apparatus and method comprises arranging a free-space optical path between the input and output of an optical signal and controlling a prism to be inserted into or removed from the free-space optical path, wherein when the prism is inserted into the free-space optical path, a switched optical path is formed and thus the light beam is refracted twice and totally reflected once by the prism so as to change the optical path. Exemplary optical switches of several different types are provided hereinafter for explanation of the principles and operations of the present invention.

Embodiment 1: 2×2 Optical Switch

Figure 1A:
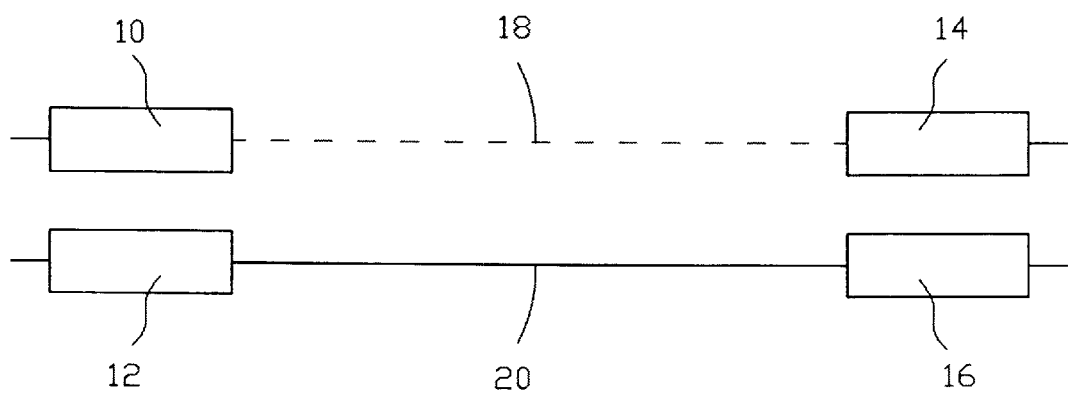
FIGS. 1A and 1B are one embodiment of the present invention applied to a 2×2 optical switch.
Figure 1B:
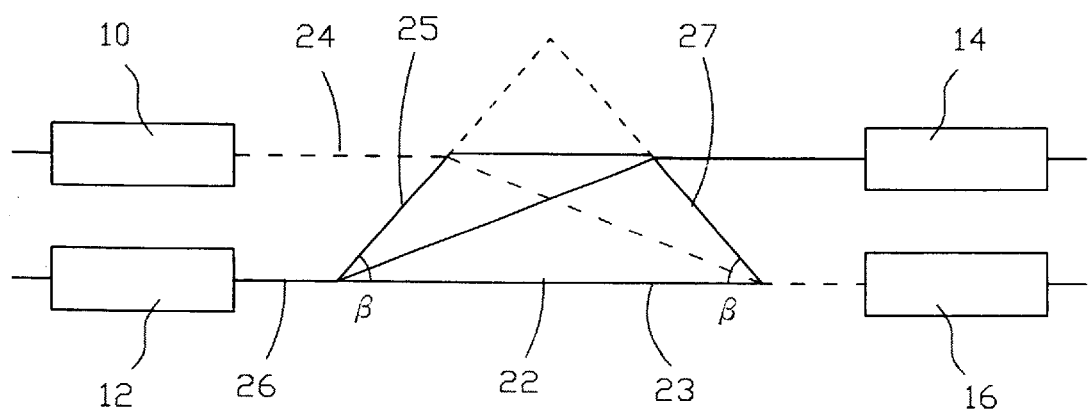

FIG. 1 is a diagram of a 2×2 optical switch, which comprises two inputs 10 and 12 and two outputs 14 and 16 for optical signals, each input and output having a collimator or collimating lens coupled to one end of a respective optical fiber as in the prior art. The inputs 10 and 12 and outputs 14 and 16 are such arranged to be two pairs of parallel I/O as shown in FIG. 1A in a manner that a free-space optical path 18 is formed between the input 10 and output 14 and another free-space optical path 20 is formed between the input 12 and output 16. In other words, the optical signal from the input 10 is coupled into the output 14 and the optical signal from the input 12 is coupled into the output 16 with these two light beams parallel to each other. As shown in FIG. 1B, when a prism 22 is inserted between the inputs 10 and 12 and the outputs 14 and 16, the optical paths of the two incident lights will be changed, i.e., the light beam from the input 10 will be refracted twice and totally reflected once by the prism 22 and then coupled into the output 16, as well as the light beam from the input 12 will be refracted twice and totally reflected once by the prism 22 and then coupled into the output 14, by such a way with the prism 22 the optical paths are changed to be 24 and 26.

The prism 22 is a dove prism or an isosceles prism with a bottom 23 parallel to the direction of the incident light beams and two symmetrical hypotenuses 25 and 27. On the surfaces of the hypotenuses 25 and 27 it can be coated with a thin film to reduce the reflection of the incident light beam and the polarization-dependent loss (PDL). After the prism 22 is inserted into the free-space optical paths 18 and 20, two parallel incident light beams incident into the prism 22 parallel and symmetrically to the optical axis of the prism 22, i.e., in the direction parallel to the bottom 23 of the prism 22, with two refractions and one total reflection by the prism 22 and become two parallel output light beams which are also parallel and symmetrically to the optical axis of the prism 22 only with positions exchanged to those of the two parallel incident light beams. In this manner, the propagation paths of the two light beams can be controlled to be straight as shown in FIG. 1A or cross as shown in FIG. 1B in order to switch the optical paths by means of the prism 22 placed at different positions.

If the prism 22 in FIG. 1 is partially black processed, then the apparatus will be a 2×2 blocking type optical switch.

Embodiment 2: 1×2 Optical Switch

Figure 2A:
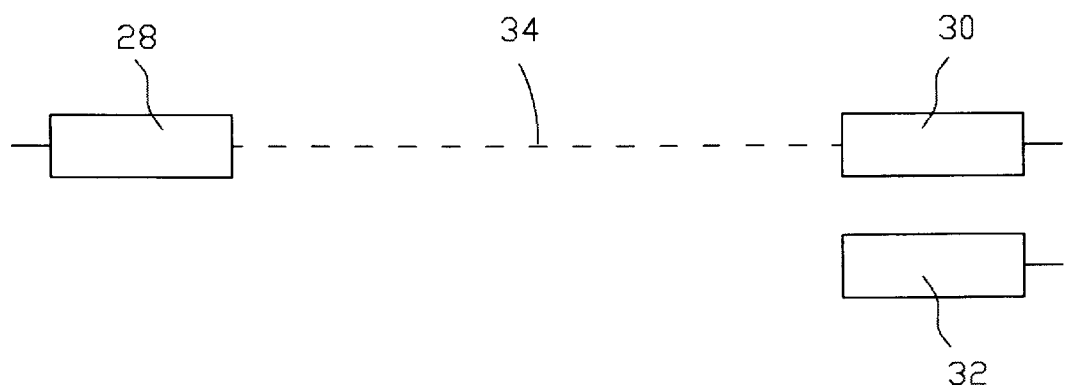
FIGS. 2A and 2B are one embodiment of the present invention applied to a 1×2 optical switch.
Figure 2B:
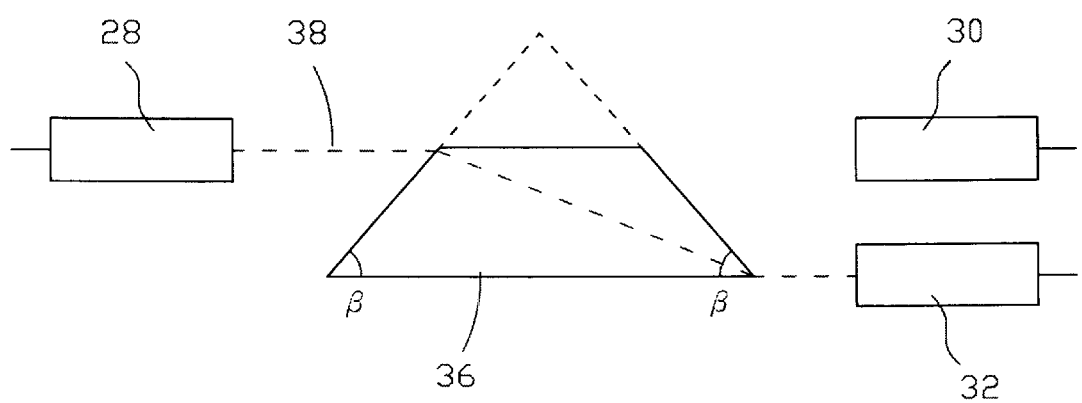

FIG. 2 is a diagram of a 1×2 optical switch, which comprises one input 28 arranged corresponding to two outputs 30 and 32 with the input 28 aimed at the output 30 and the other output 32 parallel to the output 30. As shown in FIG. 2A, a free-space optical path 34 is formed between the input 28 and output 30 before switched for the incident light beam from the input 28 to be coupled into the output 30. After switched, as shown in FIG. 2B, the prism 36 is inserted between the input 28 and output 30, a different optical path 38 is thus formed such that the incident light beam from the input 28 incidents into the prism 36 in the direction parallel to the optical axis of prism 36 and becomes the output light beam after two refractions and one total reflection by the prism 36 at a position different from that shown in FIG. 2A, which is coupled to the output 32 now.

Embodiment 3: On-off Optical Switch

Figure 3A:
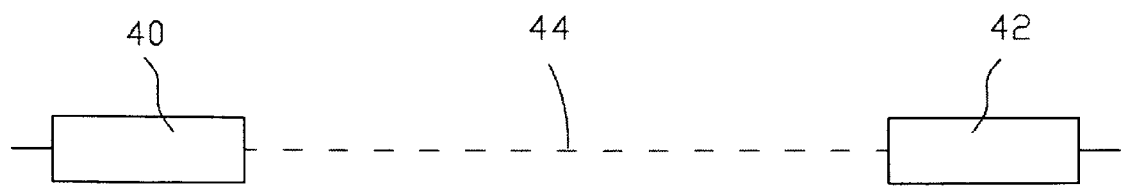
FIGS. 3A and 3B are one embodiment of the present invention applied to an on-off optical switch.
Figure 3B:
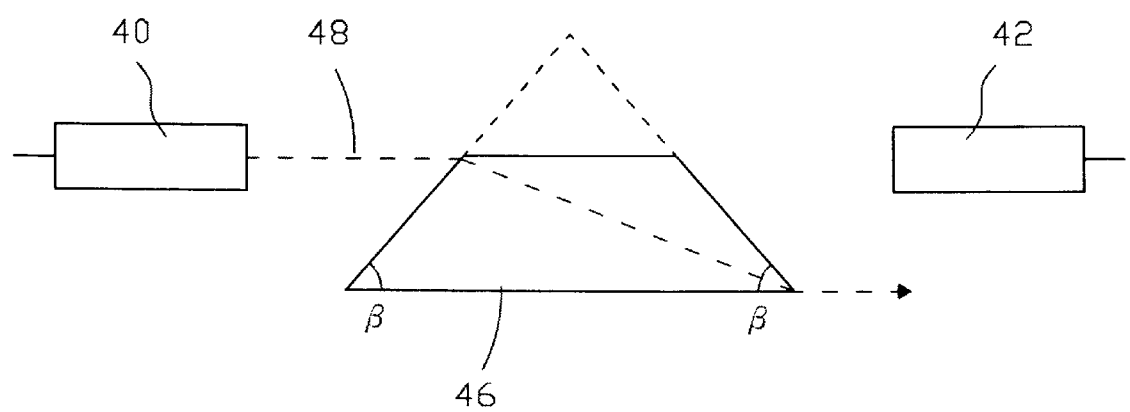

As shown in FIG. 3, an on-off optical switch comprises one pair of input 40 and output 42 aimed at each other for an optical signal. As shown in FIG. 3A, a free-space optical path 44 is formed between the input 40 and output 42 at on state, by which the light beam from the input 40 is directly coupled into the output 42. At off state, as shown in FIG. 3B, a prism 46 is inserted between the input 40 and output 42 and a switched optical path 48 is thus formed, at that time, the incident light beam incidents into the prism 46 and is directed to somewhere else after two refractions and one total reflection, instead of being coupled into the output 42.

Embodiment 4: 2×4 Optical Switch

Figure 4:
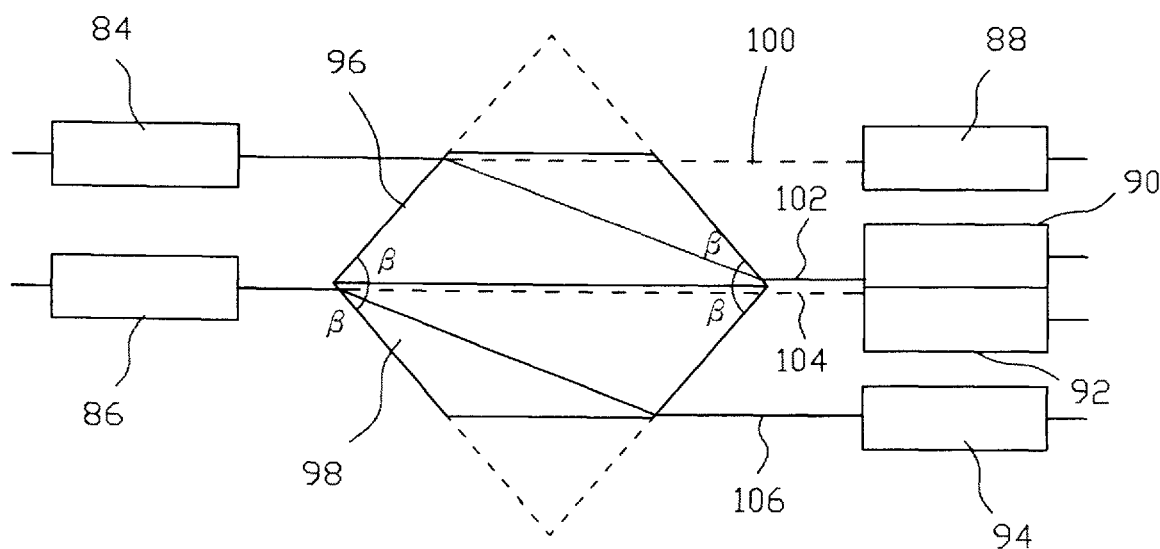
FIG. 4 is one embodiment of the present invention applied to a 2×4 optical switch.

FIG. 4 is a diagram of a 2×4 optical switch, which is a combination of two 1×2 optical switches as the above-mentioned and comprises two inputs 84 and 86, four outputs 88–94, and two prisms 96 and 98 having their bottoms attached together and coated with antireflective coating (ARC). Before the prisms 96 and 98 are inserted into, two incident light beams from the inputs 84 and 86 are coupled into the outputs 88 and 92 along two free-space optical paths 100 and 104 respectively. After the prisms 96 and 98 are inserted into, the two incident light beams from the inputs 84 and 86 respectively incident into the prisms 96 and 98 in the direction parallel to the optical axis of the prism 96 and 98 and is refracted twice and totally reflected once by the prism to be coupled to the outputs 90 and 94 along two switched optical paths 102 and 106. In this way, optical switches with more I/O are available by stacking more prisms.

Embodiment 5: 2×1 Optical Switch

Figure 5A:
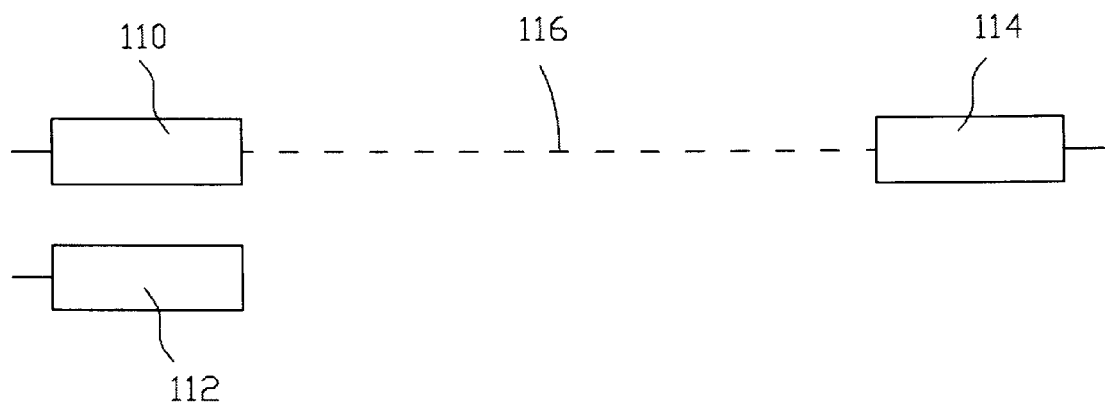
FIGS. 5A and 5B are one embodiment of the present invention applied to a 2×1 optical switch.
Figure 5B:
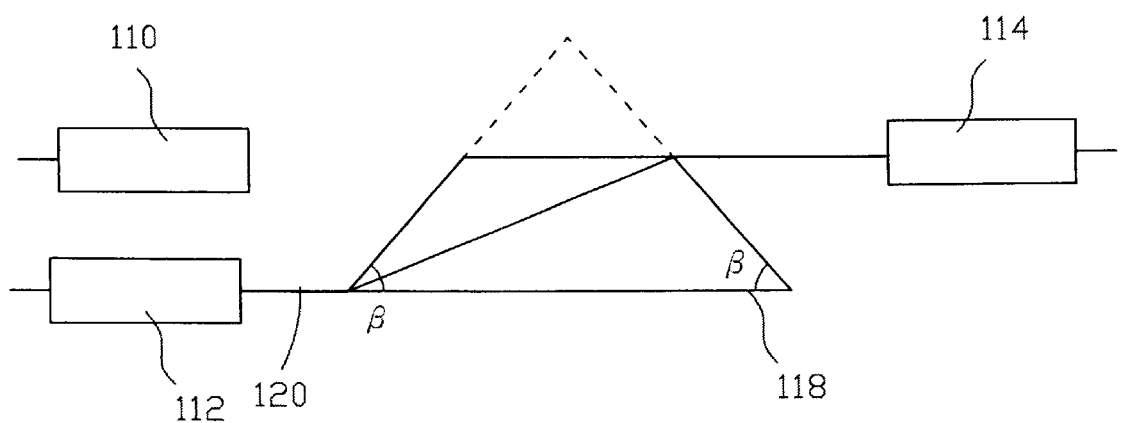

As shown in FIG. 5, a 2×1 optical switch comprises two inputs 110 and 112 for optical signals such arranged corresponding to one output 114. As shown in FIG. 5A, a free-space optical path 116 is formed between the input 110 and output 114 before switched for the light beam from the input 110 to be directly coupled into the output 114. After switched, as shown in FIG. 5B, a prism 118 is inserted into the free-space optical path 116 to form a switched optical path 120, at that time, the incident light beam from the input 112 incidents into the prism 118 in the direction parallel to the optical axis of prism 118 and is directly coupled into the output 114 after two refractions and one total reflection by the prism 118.

Embodiment 6: 3×6 Optical Switch

Figure 6:
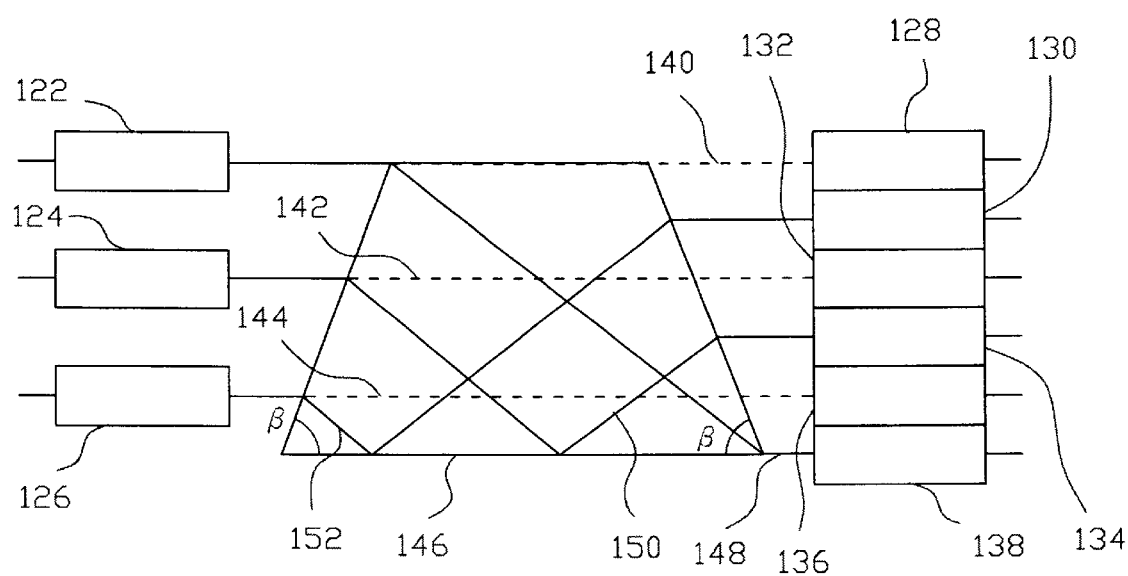
FIG. 6 is one embodiment of the present invention applied to a 3×6 optical switch.
Figure 7A:
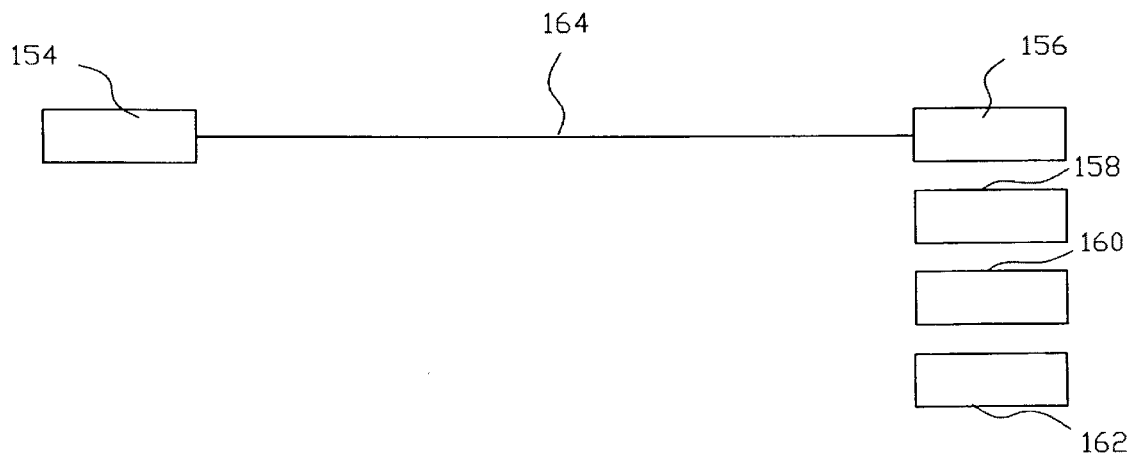
FIGS. 7A to 7D are one embodiment of the present invention applied to a 1×4 optical switch.
Figure 7B:
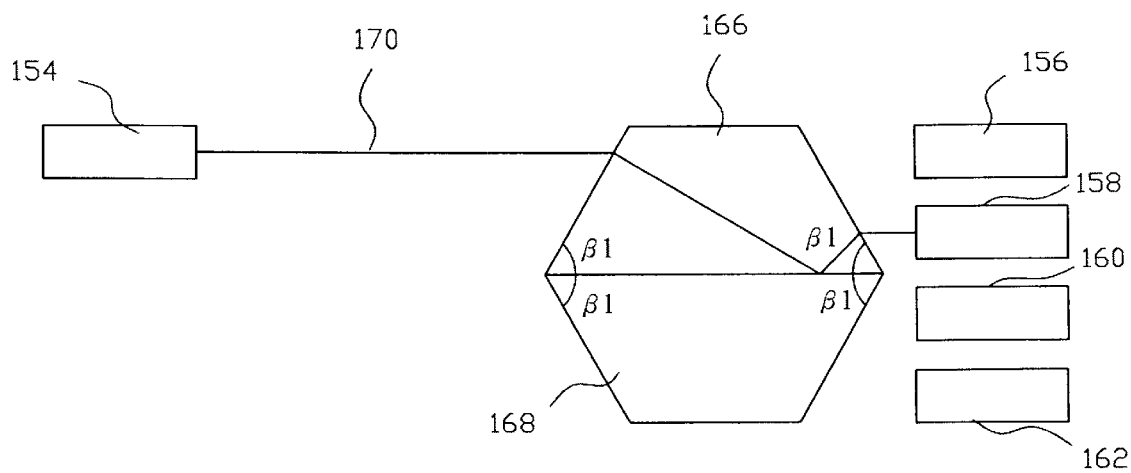
Figure 7C:
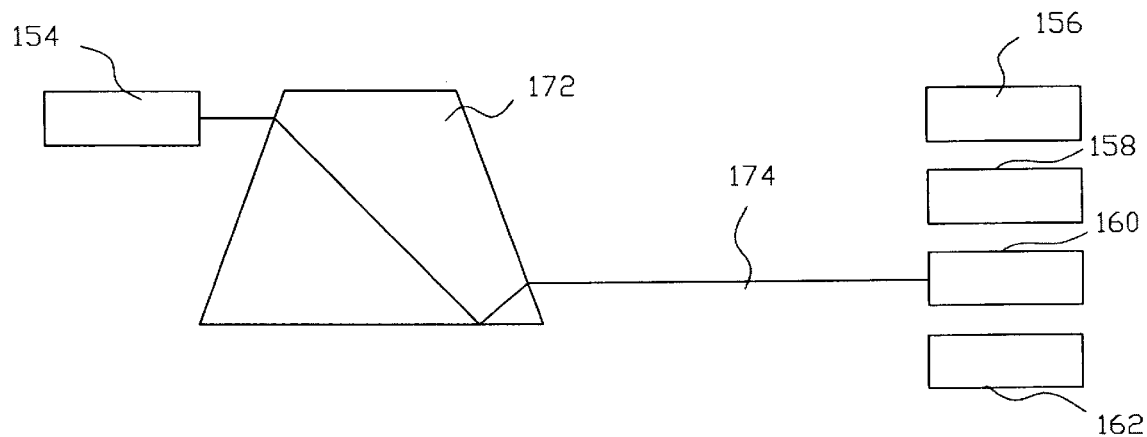
Figure 7D:
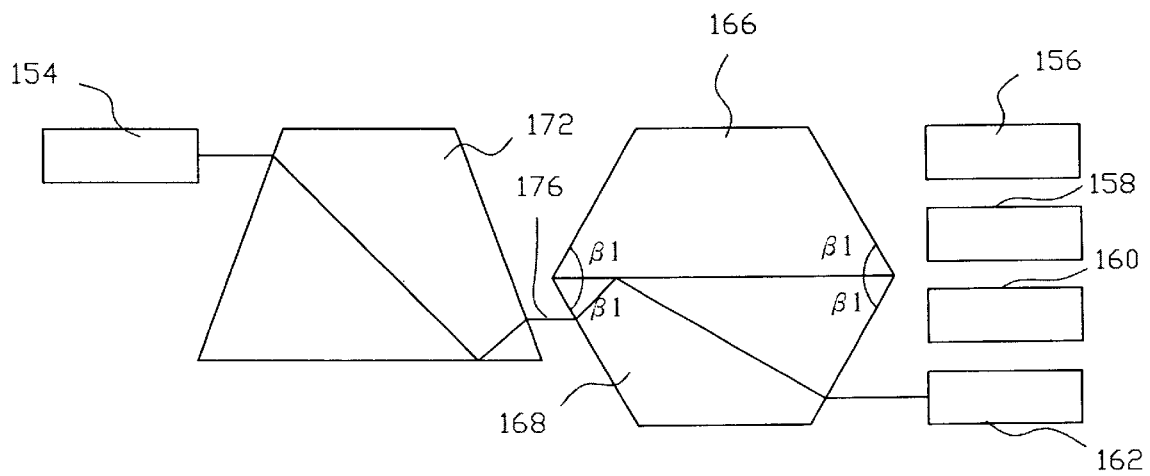

In the above-mentioned embodiments, each prism is arranged corresponding to one or two I/O, however, the situation with more I/O can be implemented. For instance, FIG. 6 is a diagram of a 3×6 optical switch comprising three inputs 122, 124 and 126, and six outputs 128, 130, 132, 134, 136 and 138, in which these I/O are all arranged to be parallel to the axis of prism 146 with three inputs 122–126 aimed at three outputs 128, 132 and 136 respectively. Before a prism 146 is inserted into, the three pairs of I/O form three free-space optical paths 140, 142 and 144. After the prism 146 is inserted into, three switched optical paths 148, 150 and 152 are formed, and thus three light beams respectively from the input 122, 124 and 126 are respectively switched into outputs 138, 134 and 130 with two refraction and one total reflection by the prism 146.

Embodiment 7: 1×4 Optical Switch

Combining a plurality of prisms can implement an optical switch such as the 1×4 optical switch shown in FIG. 7, which comprises one input 154 and four outputs 156, 158, 160 and 162 enable to be inserted therebetween with a prism 172 and a combined prisms 166 and 168 with an antireflective film coated on their attached surfaces. As shown in FIG. 7A, a free-space optical path 164 is formed between the input 154 and output 156 before all of the prisms are inserted into. After the combined prisms 166 and 168 are inserted into, as shown in FIG. 7B, a switched optical path 170 is formed, and the incident light beam is refracted twice and totally reflected once by the prism 166 and thus switched into the output 158. If the prism 172 instead of the prisms 166 and 168 is inserted as shown in FIG. 7C, a second switched optical path 174 is formed, at this time, the incident light beam is refracted twice and totally reflected once by the prism 172 and thus switched into the output 160. Finally, a third switched optical path 176 is formed when all the prism 172, 166 and 168 are inserted as shown in FIG. 7D, the incident light beam will be refracted twice and totally reflected once by the prism 172 and then refracted twice and totally reflected once by the prisms 168, so as to be switched into the output 162. In this way, more optical switches of different types are available.

Embodiment 8: 2×2 Optical Switch

Figure 8A:
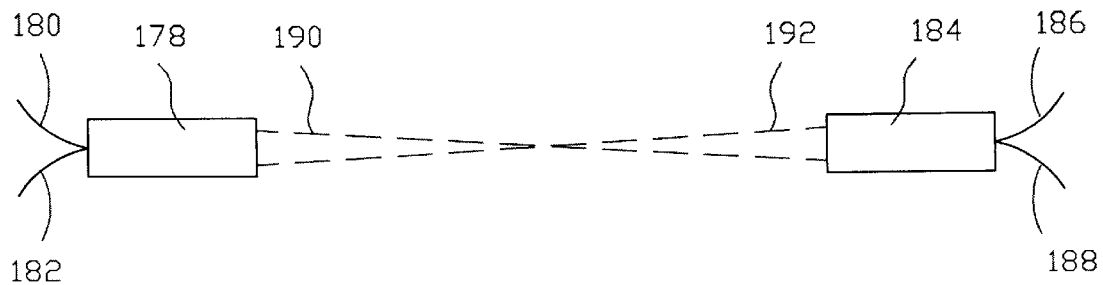
FIGS. 8A and 8B are another embodiment of the present invention applied to a 2×2 optical switch.
Figure 8B:
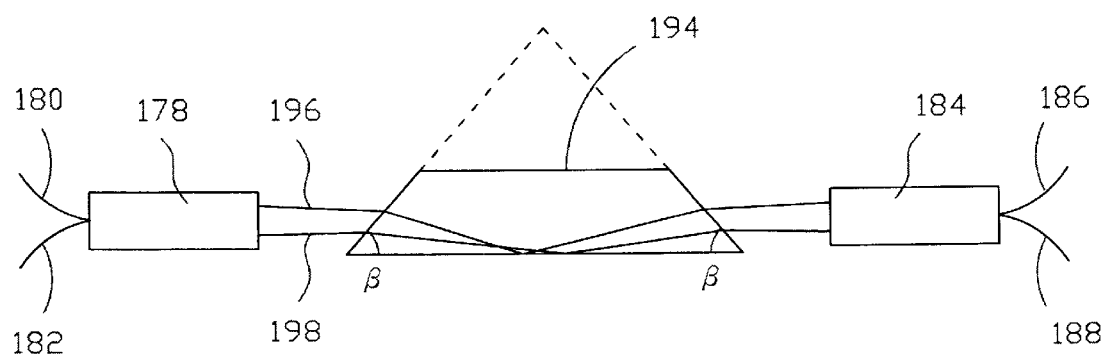

FIG. 8 is a diagram of another 2×2 optical switch implemented with a different type of I/O device. In this apparatus, a double-optical-fiber collimator is used for the input 178, which provides two input optical fibers 180 and 182, and the output 184 is also used with a double-optical-fiber collimator, which provides two output optical fibers 186 and 188. As shown in FIG. 8A, the input 178 and output 184 are arranged such that two free-space optical paths 190 and 192 are formed therebetween to couple the optical fiber 180 to the optical fiber 188 and the optical fiber 182 to the optical fiber 186. The angle between the two free-space optical paths 190 and 192 is about 0.5 to 3 degrees, however, for a more clear explanation in the drawing, the distance between the ends of the two free-space optical paths 190 and 192 and the angle therebetween are both enlarged. For more detail about such type of collimators, readers are referred to U.S. Pat. No. 6,249,625 issued to Pan for instance. As shown in FIG. 8B, after a prism 194 is inserted into, two switched optical paths 196 and 198 are formed, and they are refracted twice and totally reflected once by the prism 194-so as to couple the optical fiber 180 to the optical fiber 186 and the optical fiber 182 to the optical fiber 188, i.e., the two light beams are switched to each other. In comparison with the optical switch using single-fiber collimator as I/O, the final embodiment using multi-fiber collimator can reduce the amount of collimators and the space between input and output, and the height and length of the prism both can be further reduced, as a result, the size and weight of the whole apparatus can be more reduced.

From the above, it should be understood that the embodiments described, in regard to the drawings, are merely exemplary and that a person skilled in the art may make variations and modifications to the shown embodiments without departing from the spirit and scope of the present invention. All variations and modifications are intended to be included within the scope of the present invention as defined in the appended claims.

What is claimed is:

1. An apparatus for switching an optical path comprising:
   an input means;
   an output means;
   a free-space optical path between said input and output means;
   a prism movable to said free-space optical path for being inserted into or removed from said free-space optical path; and
   a switched optical path refracted twice and totally reflected once by said prism to direct a light beam from said input means to a location spaced apart from said output means.

2. An apparatus according to claim 1 wherein said prism is a wedge prism or an isosceles prism.

3. An apparatus according to claim 1 further comprising a second output for being coupled with said switched optical path.

4. An apparatus according to claim 3 further comprising:
   a second prism attached to said first prism;
   a second input means;
   a third output means;
   a second free-space optical path between said second input and third output means;
   a fourth output means; and
   a second switched optical path for coupling a second light beam from said second input means to said fourth output means with two refractions and one total reflection by said second prism.

5. An apparatus according to claim 1 further comprising:
   a second input means; and
   a second switched optical path formed by insertion of said prism between said second input means and output means with two refractions and one total reflection by said prism to couple a second light beam from said second input means to said output means.

6. An apparatus according to claim 1 further comprising:
   a second input means;
   a second output means; and
   a second free-space optical path between said second input and output means;
   wherein a second switched optical path is formed by insertion of said prism for coupling a second light beam from said second input means to said first output means with two refractions and one total reflection by said prism and said first switched optical path to said second output means.

7. An apparatus according to claim 1 further comprising:
   a second prism movable to said switched optical path; and
   a second switched optical path formed with two refractions and one total reflection by said second prism with insertion of said second prism into said first switched optical path.

8. An apparatus according to claim 7 wherein said second prism is a wedge prism or an isosceles prism.

9. An apparatus according to claim 1, wherein said prism is a dove prism.

10. A method for switching an optical path comprising the steps of:
    arranging a free-space optical path between an input and an output; and
    moving a prism relative to said free-space optical path so that said prism is inserted into or removed from said free-space optical path, wherein by insertion of said prism into said free-space optical path a switched optical path is formed with two refractions and one total reflection by said prism to direct a light beam from said input to a location spaced apart from said output.

11. A method according to claim 10 further comprising arrangement of a second output being coupled with said switched optical path.

12. A method according to claim 10 further comprising arrangement of a second input for forming a second switched optical path with two refractions and one total reflection by said prism to couple a light beam from said second input to said output by inserting said prism between said second input and output.

13. A method according to claim 10 further comprising arrangement of a second prism for forming a second switched optical path with two refractions and one total reflection by said second prism with insertion of said second prism into said first switched optical path.

14. An apparatus for switching optical paths comprising:
   a plurality of input means;
   a plurality of output means;
   a plurality of free-space optical paths between said a plurality of input and output means; and
   at least one prism movable to said a plurality of free-space optical paths for being inserted into or removed from said a plurality of free-space optical paths to switch at least one light beam from said a plurality of input means between said a plurality of output means;
   wherein each said at least one light beam is refracted twice and totally reflected once when passing through each said at least one prism.

15. An apparatus according to claim 14 wherein each said at least one prism is a wedge prism or an isosceles prism.

16. A method for switching optical paths comprising the steps of:
   arranging a plurality of free-space optical paths between a plurality of inputs and outputs; and
   moving at least one prism relative to said a plurality of free-space optical paths for being inserted into or removed from at least one of said a plurality of free-space optical paths to switch a plurality of light beams from said a plurality of inputs between said a plurality of outputs, wherein each of said light beams is refracted twice and totally reflected once when passing through said at least one prism.

17. An apparatus for switching an optical path comprising:
   one input means;
   a plurality of output means arranged corresponding to said input means; and
   a plurality of prisms that are individually inserted into or removed from between said input and a plurality of output means, wherein a light beam from said input means is switched between said a plurality of output means by one or more of said prisms, each of which refracts said light beam twice and totally reflects it once.

18. An apparatus according to claim 17 wherein each of said a prisms is a wedge prism or an isosceles prism.

19. A method for switching an optical path comprising the steps of:
   arranging one input corresponding to a plurality of outputs;
   arranging a plurality of prisms that are individually inserted into or removed from between said input and a plurality of outputs for a light beam being refracted twice and totally reflected once by each inserted prism; and
   positioning one or more of said prisms to switch said light beam from said input between said a plurality of outputs.

20. An apparatus for switching optical paths comprising:
   a first multi-fiber collimator having a plurality of input optical fibers;
   a second multi-fiber collimator having a plurality of output optical fibers;
   a plurality of free-space optical paths between said first and second collimators;
   at least one prism movable to said plurality of free-space optical paths for being inserted into or removed from said plurality of free-space optical paths; and
   a plurality of switched optical paths formed between said first and second collimators, with each of said plurality of switched optical paths being refracted twice and totally reflected once by said at least one prism.

21. An apparatus according to claim 20 wherein said at least one prism is a wedge prism or an isosceles prism.

22. An apparatus according to claim 20 wherein said plurality of free-space optical paths form an angle of 0.5 to 3 degrees between each other.

* * * * *